US012252858B2

(12) United States Patent
Haun (10) Patent No.: US 12,252,858 B2
(45) Date of Patent: Mar. 18, 2025

(54) SEABED FOUNDATIONS (71) Applicant: SUBSEA 7 (US) LLC, Houston, TX (US)

(72) Inventor: Richard Haun, Richmond, TX (US)

(73) Assignee: SUBSEA 7 (US) LLC, Houston, TX (US)

(*) Notice: Subject to any disclaimer, the term of this patent is extended or adjusted under 35 U.S.C. 154(b) by 0 days.

(21) Appl. No.: 18/286,792

(22) PCT Filed: Apr. 13, 2022

(86) PCT No.: PCT/US2022/024642
§ 371 (c)(1),
(2) Date: Oct. 13, 2023

(87) PCT Pub. No.: WO2022/221422
PCT Pub. Date: Oct. 20, 2022

(65) Prior Publication Data
US 2024/0191453 A1   Jun. 13, 2024

(30) Foreign Application Priority Data
Apr. 14, 2021 (GB) ..................... 2105317

(51) Int. Cl.
*F16L 1/16* (2006.01)
*E02D 27/52* (2006.01)

(52) U.S. Cl.
CPC .............. *E02D 27/525* (2013.01); *F16L 1/16* (2013.01)

(58) Field of Classification Search
CPC .......... E02D 27/525; E02D 15/08; F16L 1/16; F16L 1/06; F16L 1/12; F16L 1/20
See application file for complete search history.

(56) References Cited

U.S. PATENT DOCUMENTS

| 4,338,045 A | 7/1982 | Cour |
| 4,389,034 A | 6/1983 | Suttles |
| 5,213,444 A | 5/1993 | Henning |
| 6,887,016 B1 | 5/2005 | Skeels |

(Continued)

FOREIGN PATENT DOCUMENTS

| GB | 2081414 A | 2/1982 |
| GB | 2224060 A | 4/1990 |

(Continued)

OTHER PUBLICATIONS

International Search Report of PCT/US2022/024642 dated Jun. 6, 2022.

(Continued)

*Primary Examiner* — Kyle Armstrong
(74) *Attorney, Agent, or Firm* — MATTINGLY & MALUR, PC (57) ABSTRACT

A subsea foundation comprises at least one mudmat having a top panel and a skirt depending from the top panel to be embedded into seabed soil. At least one auxiliary plate is supported by the mudmat, the plate being deployable downwardly like a guillotine blade from a raised, retracted position in which the plate is held above a lower edge of the skirt into a lowered, deployed position in which the plate extends beneath the lower edge of the skirt to be embedded further into the seabed soil. The foundation may be used to restrict movement of an elongate subsea element, such as a pipeline, relative to the seabed.

31 Claims, 4 Drawing Sheets

(56) References Cited

U.S. PATENT DOCUMENTS

| | | |
|---|---|---|
| 8,882,392 B1 | 11/2014 | Cruz et al. |
| 10,781,941 B1 | 9/2020 | Gregory |
| 2004/0265068 A1 | 12/2004 | Guedes De Melo |
| 2010/0086363 A1 | 4/2010 | Manimala |

FOREIGN PATENT DOCUMENTS

| | | |
|---|---|---|
| GB | 2511500 A | 9/2014 |
| GB | 2582271 A | 9/2020 |
| KR | 2019/0031868 A | 3/2019 |
| KR | 102168967 B1 | 10/2020 |
| WO | 2014/207560 A2 | 12/2014 |

OTHER PUBLICATIONS

International Preliminary Report on patentability dated Jun. 6, 2023.
International Preliminary Report on Patentability and Written Opinion for PCT/US2022/024642 mailed Feb. 5, 2024.

SEABED FOUNDATIONS

This invention relates to seabed foundations for resisting movement of subsea structures, such as pipelines used in the offshore oil and gas industry. Embodiments of the invention, to be described, address the challenges of anchoring a subsea pipeline with improved resistance to movement but at a lower cost than previous solutions.

Subsea pipelines must be held stable on the seabed both laterally and axially to avoid unplanned stresses and environmental risk. For example, a subsea pipeline may require anchoring against axial movement during installation to allow a pipelay vessel to maintain tension in a pipeline catenary, especially when initiating the pipelay operation.

A subsea pipeline may also require anchoring during its service life. In particular, a subsea pipeline is susceptible to move across the seabed over time after installation, especially down an incline if the seabed is sloped to any extent. Such movement may be driven by cycles of thermal elongation and contraction caused by temperature fluctuations between operation and shut-down, or by sea dynamics such as tidal currents or the effects of storms. Eventually, those influences can lead to an effect known as 'walking' of the pipeline laterally across the seabed away from its original position.

A subsea pipeline can also be deflected by other external influences, such as by motion of a riser connecting the pipeline to the surface, or by impact due to over-trawling.

Whatever its cause, uncontrolled displacement of a subsea pipeline after installation generates local stress concentrations that can cause the pipeline to buckle. Buckling may damage the pipeline and can make connections to other subsea infrastructure problematic.

One approach to mitigate buckling is to lay a pipeline along a sinuously-curved route or to incorporate expansion loops along the length of the pipeline at which the pipeline is relatively free to move relative to the seabed. Creating curves or loops in the pipeline layout absorbs damaging compressive forces and promotes the appearance of buckles in a controlled manner at selected locations.

Another way of mitigating buckling is to anchor the pipeline to the seabed. Typically, the pipeline is anchored at its ends by end structures or terminal structures and/or at intervals along its length by inline structures such as a longitudinal series of hold-back clamps. For example, pipeline motion may be restrained by anchoring the pipeline as disclosed in U.S. Pat. No. 8,882,392, in which anchor chains connect one or more hold-back clamps, attached to the exterior of the pipeline, to anchors embedded in the seabed. Other anchoring structures may be supported by a pile that is embedded, driven or grouted into the seabed or by a mudmat comprising a peripheral skirt embedded in the seabed.

Greater hydrostatic pressures and higher fluid temperatures are being encountered as hydrocarbon production is being performed in increasing water depths. This results in larger forces being required to restrain movement of subsea pipelines, particularly on seabed slopes.

Conventionally, restraint of pipelines against axial movement has been provided by suction pile systems. Often this requires paired suction piles, one on each side of a pipeline, both piles being linked by chains or rigid links to a restraint such as a collar that is fixed to the pipeline. Such a complex arrangement may be necessary to balance forces on the pipeline unless there is space for a single pile to be placed beyond an end of the pipeline in alignment with the centreline of the pipeline.

Suction piles are expensive to fabricate; also, installing the piles and their related links is a lengthy and complex process. For example, seabed metrology may have to be performed after pile installation to determine the dimensions of rigid links to be fabricated and installed subsequently. Alternatively, heavy chains may require tensioning on the seabed to remove slack and to equalise tensile forces to prevent side-loading the pipeline. These time-consuming activities must be carried out by large offshore vessels and support equipment that have high operating and capital costs and are constrained by the availability of suitable weather windows. When decommissioning a subsea installation at the end of the life of a field, these activities must be reversed to remove the piles, incurring additional costs in offshore operations.

Shallow foundations such as mudmats are less expensive than suction piles to fabricate and are relatively simple to install and remove using a smaller installation vessel. However, shallow foundations are generally limited in terms of the reaction force they can provide. The load-restraining limitation of shallow foundations is largely due to weak seabed soil. As soil strength increases progressively below the mudline, the available soil reaction is highly dependent upon the depth of soil engagement. However, shallow foundation designs are limited to relatively shallow penetration into the seabed by their self-weight; also, limitations of fabrication and installation militate against extending the depth of their penetrating skirts.

It is possible to retrofit a pipeline for buckle mitigation. For example, anchoring may be achieved by pinning the pipeline to the seabed soil using staple-like brackets as disclosed in U.S. Pat. No. 4,389,034 or by connecting a collar around the pipeline to static foundations such as piles as proposed in GB 2081414. However, staple-like fixings are insufficiently resistant to high loads, and arrangements of piles and collars are expensive to manufacture and to install as noted above. Installing anchors or piles in a sloping seabed can also be challenging.

WO 2014/207560 to a sister company of the Applicant proposes installation of a mudmat foundation after pipelaying. Specifically, a mudmat foundation structure straddling the pipeline is connected at the seabed to a pipeline accessory such as an in-line tee incorporated into the pipeline. Once the foundation structure has been docked with the accessory and laid on the seabed, the accessory and the attached pipe are lifted clear of the seabed to transfer their weight to the foundation structure. In that case, the primary purpose of the foundation structure is to support the weight of the accessory rather than to anchor the pipeline. In principle, skirts on the mudmat could be omitted, thus allowing the mudmat to slide across the seabed while still satisfying its primary purpose of supporting the weight of the accessory.

KR 2019/0031868 describes the use of an inner partition wall in a suction bucket to improve the support force of a suction pile in order to address issues with seabed settlement after the suction pile is installed.

GB 2511500 relates to a mudmat that is provided with stowable foundation elements that reduce the size of the mudmat when stowed but can be deployed to cover a greater area and lower the centre of gravity of the mudmat and any accessories fitted thereto in order to increase stability.

U.S. Pat. No. 5,213,444 discloses an apparatus for separating oil and/or gas leaking from an underwater oil well or transport system. The apparatus comprises a collector unit that floats on the surface of the sea and a downwardly extending skirt section to collect the leaking oil/gas.

GB 2582271 describes the use of barb elements on a skirt of a subsea foundation embedded into the seabed, such as a suction pile. The barb elements aid penetration of the skirt into the seabed in a distal direction and then resist movement of the subsea foundation in an opposed proximal direction.

Against this background, the invention provides a subsea foundation that comprises: at least one mudmat having a top panel and a skirt depending from the top panel to be embedded into seabed soil; and at least one auxiliary plate supported by the mudmat, the plate being deployable downwardly from a raised, retracted position in which the plate is held above a lower edge of the skirt into a lowered, deployed position in which the plate extends beneath the lower edge of the skirt to be embedded further into the seabed soil.

The or each plate may extend parallel to a portion of the skirt and may be deployable along a path that extends parallel to the skirt. The or each plate may suitably be positioned between the top panel and the skirt, for example on an inboard side of the skirt or on an outboard side of the top panel. The or each plate could slide against the skirt during deployment.

Conveniently, the or each plate may be arranged to free-fall from the retracted position into or toward the deployed position. For example, the foundation could further comprise at least one ROV-operable latch that is arranged to hold the or each plate raised in the retracted position and that is operable to release the or each plate to drop into the deployed position.

In preferred embodiments to be described, the foundation comprises a pair of these mudmats, mutually spaced about a central channel. The mudmats of the pair may be joined by a bridge structure that extends across the channel. The or each plate is suitably outboard of the bridge structure. The channel is preferably open-ended and open-bottomed.

The foundation may further comprise a stab mechanism having at least one downwardly-extending pin that is deployable downwardly into the seabed soil. The stab mechanism may be aligned with or disposed in the channel between the mudmats of the pair. In that case, the stab mechanism may comprise a pair of parallel pins that are spaced apart in a lateral direction across the channel.

The inventive concept embraces a subsea installation that comprises, in combination, an elongate subsea element such as a subsea pipeline, and a foundation of the invention co-operating with the elongate element to restrict movement of the elongate element across the seabed. Conveniently, the elongate element may comprise engagement formations that are co-operable with complementary formations of the foundation.

Where the foundation comprises a channel between paired mudmats, the elongate element suitably extends along, and longitudinally beyond, the channel. Where the foundation has a stab mechanism comprising parallel pins, the elongate element may be received in a space between the pins.

Correspondingly, the inventive concept extends to a method of fixing a subsea foundation at a seabed location. That method comprises: lowering a foundation of the invention to the seabed location; embedding the skirt of the or each mudmat into soil of the seabed; and then deploying the or each plate into the deployed position, embedded deeper then the skirt into the soil of the seabed.

The foundation may, for example, be used to restrict movement of an elongate subsea element, such as a subsea pipeline, across the seabed. For that purpose, the foundation may be landed on top of the elongate element previously laid on the seabed. More specifically, where the foundation comprises paired mudmats, the mudmats of the pair can be landed on mutually-opposed sides of the elongate element with the elongate element being received in the channel between them.

Engagement formations of the elongate element may be engaged with complementary formations of the foundation, for example with pins of a stab mechanism of the foundation. In that case, the pins of the stab mechanism may suitably be deployed before deploying the or each plate of the foundation.

After fixing the foundation at a first seabed location, the or each plate may be returned to the retracted position before moving the foundation to be fixed at a second seabed location. Conveniently, the foundation may be moved from the first seabed location to the second seabed location while remaining underwater.

The first and second seabed locations could be spaced apart longitudinally along an elongate subsea element. For example, the foundation could be used at the first seabed location to restrict movement of the elongate element when initiating laying of the elongate element. Then, the foundation could be used at the second seabed location to restrict movement of the elongate element after the elongate element has been laid on the seabed.

The invention encompasses a system that greatly increases the capacity of shallow foundations by incorporating novel guillotine-type devices or end plates that are released subsea from a foundation structure after the structure is accurately located on a subsea pipeline. Upon release, free-fall dynamics assist the plates to embed deeply into the seabed soil, exceeding normal self-embedment limits.

Thus, the foundation of the invention comprises a seabed structure that is modified with dynamically-released guillotine-type vertical plates, the plates preferably being guided for movement within the structure. A release mechanism is configured to retain the plates when raised, acting as a latching mechanism. Releasing the plates provides dynamic loading due to free-fall such that their momentum enhances their self-weight. Consequently, on being released to drop relative to the supporting structure, the blades aggressively penetrate seabed soil that would normally resist such penetration.

The design objective is to engage the strength of the underlying soil to achieve increased resistance to movement. In this respect, the additional bearing area of the deeply-embedded plates engages a large volume of the seabed soil to provide a firm foundation. Also, the deeper soil naturally has greater consolidation providing increased resistance, further enhanced by the increased overburden weight of the overlying soil closer to the mudline.

By virtue of the invention, the load-bearing capacity of a shallow foundation can be increased greatly, potentially being at least doubled, to satisfy many of the pipeline restraint requirements presently encountered in the industry.

The release mechanism maintains the plates level and vertical until released, for example by an ROV at the seabed, or by releasing supporting buoyancy subsea, or on command of personnel above water. Restraints or stop formations may limit the travel of the plates to a desired depth below the mudline to suit the application. Means may be provided to assist removal and re-installation of the foundation for re-use, such as a hydraulic or otherwise-powered drive acting on the plates or temporary addition of buoyancy to raise the plates to a retracted, latched position.

The ability of the plates to deploy and to be retracted easily enables the system to be repositioned with minimal subsea operations. This allows the system to be used for pipeline and riser installation and start-up operations and then to be removed and redeployed as an individual pipeline restraint to resist axial and lateral movement of the pipeline.

Thus, a foundation of the invention can have dual capability. Specifically, when deployed to the seabed, the foundation can restrain axial movement of a pipeline or riser to sustain the tension required to control stress during installation. Afterwards, the foundation can be removed and reinstalled elsewhere over an installed pipeline to restrain movement of the pipeline axially and/or laterally. This dual capability reduces the number of seabed structures required to be deployed and can reduce installation time for redeployment because after being used for initiation, the foundation does not have to be brought back to the surface before being reinstalled over the installed pipeline. These benefits markedly reduce the cost of hydrocarbon production infrastructure.

By virtue of the invention, greater resistance to movement can be obtained with less cost than competing technology. The foundation structure can be post-installed on a pipeline, which may be pre-equipped with a special clamp allowing axial movement of the pipeline to be restrained.

Embodiments of the invention provide a pipeline anchoring structure comprising: an upper straddle to be installed on the pipeline; and a skirted foundation that comprises at least one vertical skirt plate embedded into the seabed. The foundation further comprises at least one vertically slidable plate, which may have a tapered bottom edge or tip. The slidable plate may be regarded as a self-embedding guillotine plate or blade.

The slidable plate may, for example, be released and slid downwards by an ROV. The slidable plate may be embedded into the seabed by gravity and/or by pushing down the slidable plate, for example with an ROV or an on-board plate drive mechanism. The slidable plate may comprise an additional weight to promote its embedment.

Embodiments of the invention also implement a method to install a pipeline anchoring system on a pre-existing or pre-installed pipeline. The method comprises: providing a pipeline anchoring structure comprising an upper straddle and a skirted foundation that has at least one vertically slidable plate locked in an upper position; lowering the pipeline anchoring structure through seawater onto the pre-existing pipeline, whereupon the pipeline could be clamped by the anchoring structure; and lowering the slidable plate of the pipeline anchoring structure into the seabed, for example after providing an ROV to release the slidable plate from the upper position.

Whilst the invention has been developed to address the challenges of anchoring a subsea pipeline, the principles of the invention can be applied to anchoring other elongate subsea elements such as the bottom of a riser, or another fluid conduit, or an umbilical, or a cable. The inventive concept can also embrace skirted mudmat-type foundations for other subsea applications.

In summary, therefore, a subsea foundation of the invention comprises at least one mudmat having a top panel and a skirt depending from the top panel to be embedded into seabed soil. At least one auxiliary plate is supported by the mudmat, the plate being deployable downwardly like a guillotine blade from a raised, retracted position in which the plate is held above a lower edge of the skirt into a lowered, deployed position in which the plate extends beneath the lower edge of the skirt to be embedded further into the seabed soil. The foundation may be used to restrict movement of an elongate subsea element, such as a pipeline, relative to the seabed.

In order that the invention may be more readily understood, reference will now be made, by way of example, to the accompanying drawings in which.

Figure 1:
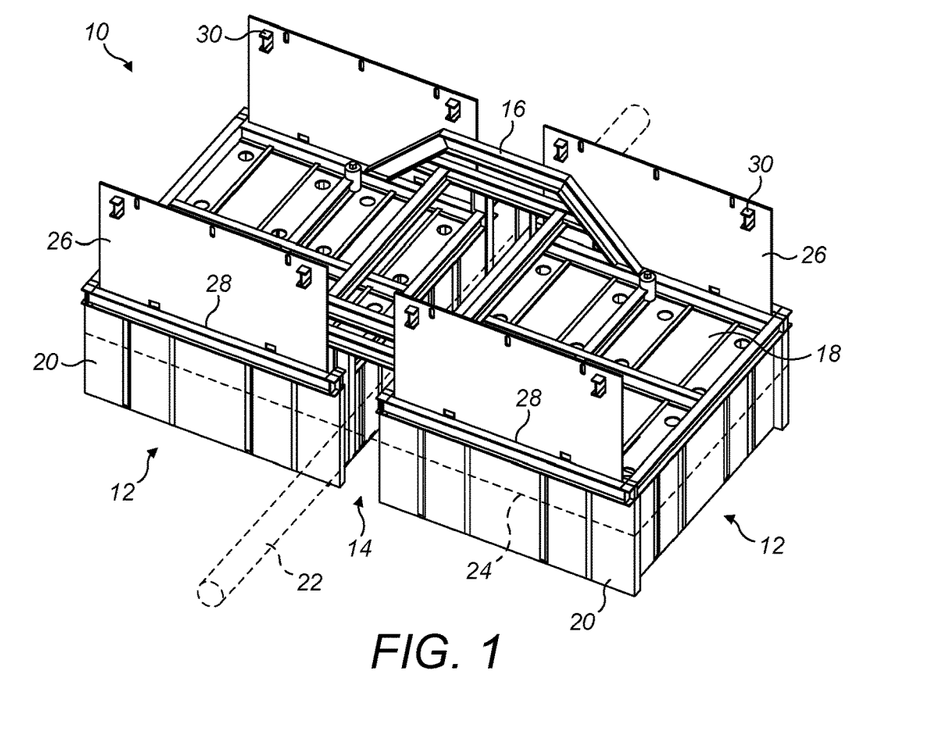
FIG. 1 is a perspective view of a subsea pipeline anchor in a first embodiment of the invention, showing auxiliary guillotine-like plates in a raised position.
Figure 2:
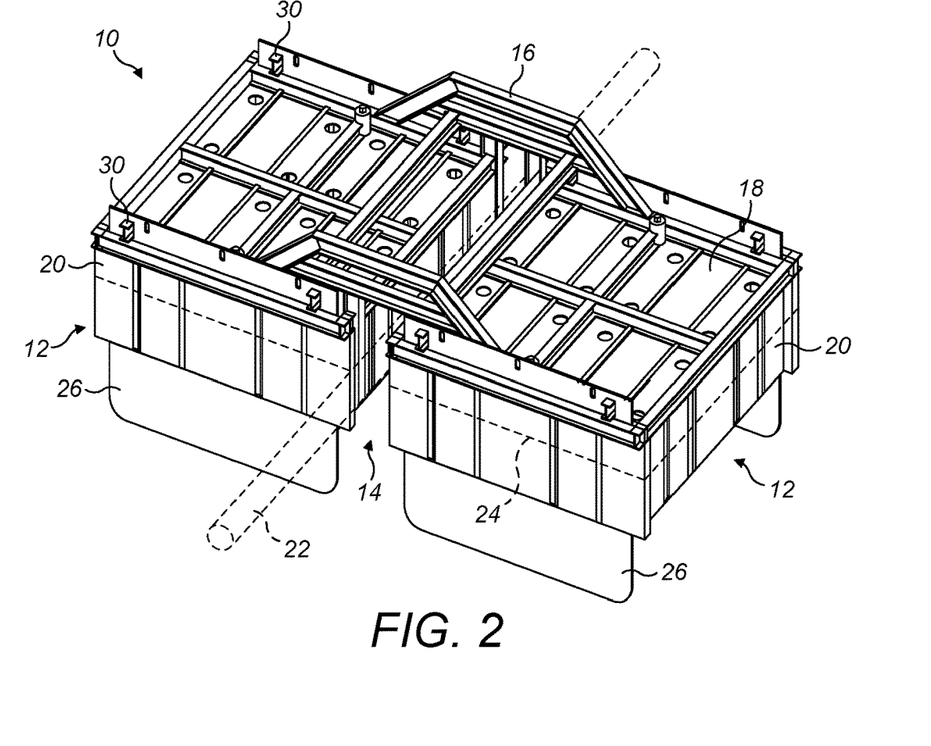
FIG. 2 corresponds to FIG. 1 but shows the pipeline anchor with the auxiliary plates deployed in a lowered position.

Referring initially to the first embodiment of the invention shown in FIGS. 1 and 2 of the drawings, a subsea foundation 10 comprises a pair of mudmats 12 that are spaced laterally apart from each other by, and are symmetrical about, an elongate central longitudinal slot or channel 14. The mudmats 12 are joined together rigidly by a bridge structure 16 that surmounts and crosses laterally over the channel 14.

Each mudmat 12 comprises a horizontal top panel 18 that is surrounded by a peripheral side wall or skirt 20. In this example, the mudmats 12 are rectangular in plan view, such that mutually-orthogonal portions of the skirt 20 depend respectively from each laterally-facing side and each longitudinally-facing end of each top panel 18. The mudmats 12 are also mutually parallel about the channel 14, such that the laterally-facing side portions of the skirts 20 in mutual opposition about the channel 14 define straight parallel sides of the channel 14.

The channel 14 is open-ended and open-bottomed to accommodate a subsea pipeline 22 that extends along, and extends longitudinally beyond, the channel 14. In this way, the mudmats 14 disposed to both sides of the channel 14 restrict lateral movement of the pipeline 22. As will be explained later in relation to the second embodiment shown in FIGS. 3 to B, further features may be provided to effect longitudinal, axial location of the pipeline 22 relative to the foundation 10.

The pipeline 22 rests on the seabed 24, the mudline level of which is represented here by a dashed line. It will be apparent that the skirts 20 of the mudmats 12 are partially embedded in the soft soil of the seabed 24 by virtue of the self-weight of the foundation 10.

In accordance with the invention, the mudmats 12 of the foundation 10 are equipped with blade-like auxiliary guillotine plates 26 that lie in respective vertical planes and that are movable vertically, in those planes, relative to the top panels 18 and the skirts 20 of the mudmats 12. Specifically, the plates 26 can be dropped from the raised, retracted position shown in FIG. 1 to the lowered, deployed position shown in FIG. 2 while remaining parallel to the adjacent portions of the skirts 20.

In the retracted position, the plates 26 are held above the bottom edge of the skirt 20. In the deployed position, the plates 28 extend beneath the bottom edge of the skirt 20, hence embedding deeper than the skirt 20 into the soil of the seabed 24. This greatly increases resistance to movement of the foundation 10 relative to the seabed 24, and so increases the load-bearing capacity of the foundation 10. The plates 26 drop quickly from the retracted position into the deployed position under their self-weight, hence impacting the seabed 24 with considerable kinetic energy to embed themselves substantially more deeply than the skirts 20.

In this example, each mudmat 12 has a pair of parallel plates 26, adjacent to and parallel to end portions of the skirt 20. Each plate 28 lies in, and moves vertically through, a respective slot 28 defined immediately inboard of the skirt 20 and outboard of the top panel 18, hence being within the periphery of the mudmat 12 in plan view.

Being inboard of the skirt 20, the plates 26 can drop without hindrance from obstructions external to the foundation 10. Being also close to the skirt 20, the plates 26 more effectively engage soil of the seabed 24 that has already been disrupted and compacted by the skirt 20.

Each plate 26 also lies longitudinally outboard of the bridge structure 16. This avoids restricting the size and shape of the bridge structure 16 which, as shown, can extend laterally beyond the laterally-inboard edges of the plates 26 opposed across the channel 14.

FIGS. 1 and 2 show the option of stop formations 30 that limit embedment of the plates 26 into the soil of the seabed 24 and that then resist upward movement of the top panels 18 and skirts 20 of the mudmats 12 relative to the embedded plates 26, in this example, the stop formations 30 protrude from the plates 26 to bear against an upper surface of the top panel 18 and/or an upper edge of the skirt 20 to each side of the slots 28.

Figure 3:
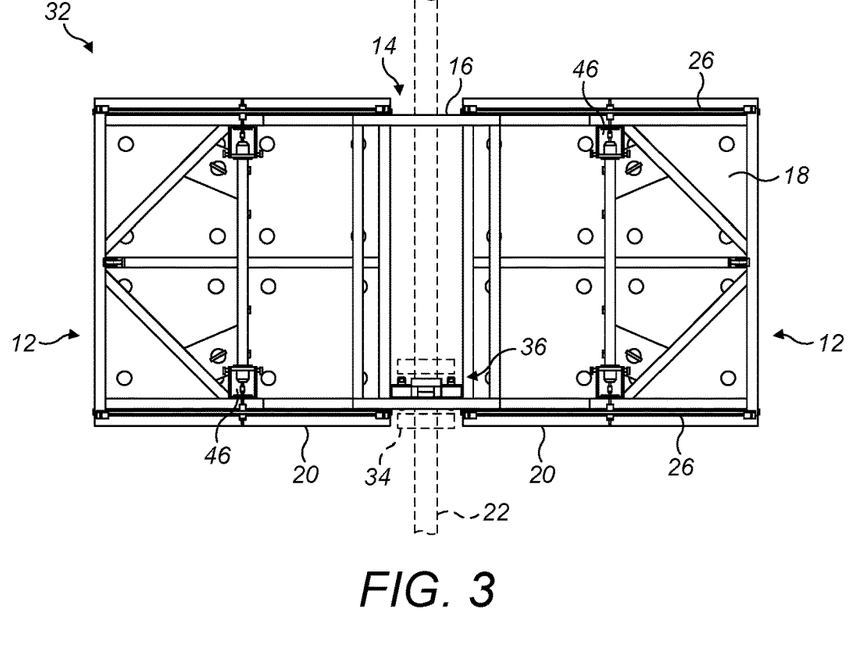
FIG. 3 is a top plan view of a pipeline anchor in a second embodiment of the invention, equipped in this example with an optional secondary fixing for engaging a pipeline.

A second embodiment of the invention is shown in FIGS. 3 to 6 of the drawings, in which like numerals are used for like features. This embodiment shows further optional features of the invention in the context of a subsea foundation 32. For example, FIG. 3 shows that the pipeline 22 may have engagement formations 34 that are co-operable with the foundation 10, those formations 34 being exemplified here by a flange, collar, clamp or other enlargement extending radially outwardly from the pipeline 22. Engagement of the formations 34 with the foundation 32 restricts axial movement of the pipeline 22 relative to the foundation 32 and may further restrict lateral movement of the pipeline 22 relative to the foundation 32.

Correspondingly, the foundation 32 has features for co-operating with the engagement formations 34 of the pipeline 22. Those co-operating features are defined here by a stab mechanism 36 that is supported by the bridge structure 16 above the channel 14 extending between the mudmats 12. The stab mechanism 36 is arranged to pin the foundation 32 to the seabed 24 and to engage the foundation 32 with the pipeline 22.

Figure 4:
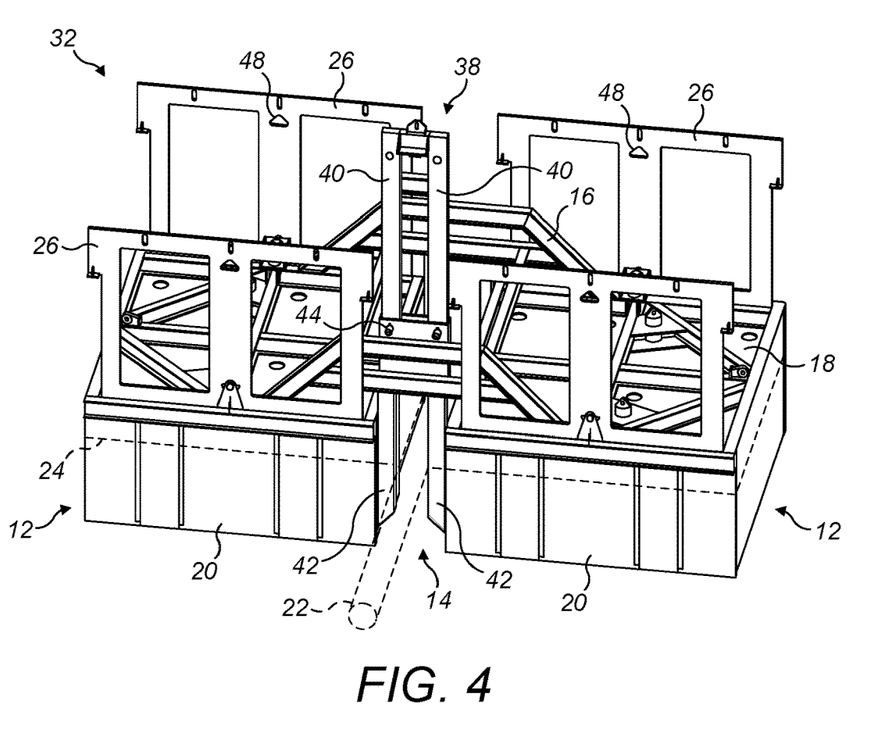
FIG. 4 is a perspective view of the pipeline anchor of the second embodiment, showing the auxiliary plates and the secondary fixing in a raised position.

The stab mechanism 36 comprises a vertically-movable fork 38 comprising a pair of parallel vertical prongs or legs 40. The legs 40 of the fork 38 slide within respective parallel rails 42 that extend vertically within the channel 14, lying against the mutually-opposed side portions of the skirts 20 that define the channel 14 between them. The legs 40 and their rails 42 are spaced apart laterally to an extent required to accommodate the pipeline 22 between them.

Figure 5:
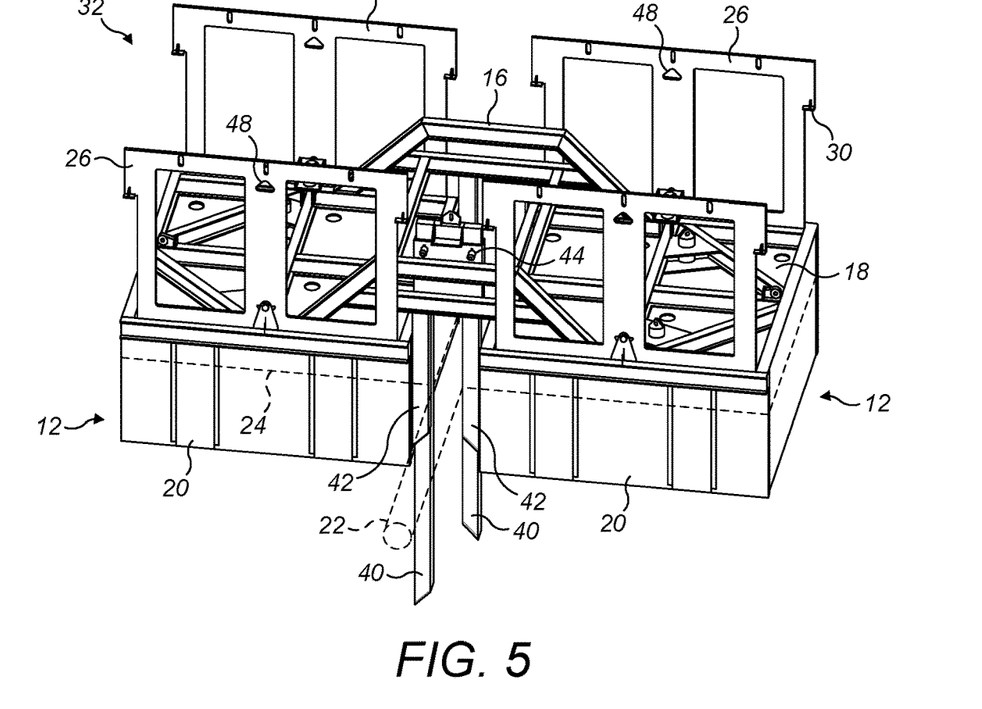
FIG. 5 corresponds to FIG. 4 but shows the pipeline anchor with the secondary fixing deployed in a lowered position.
Figure 6:
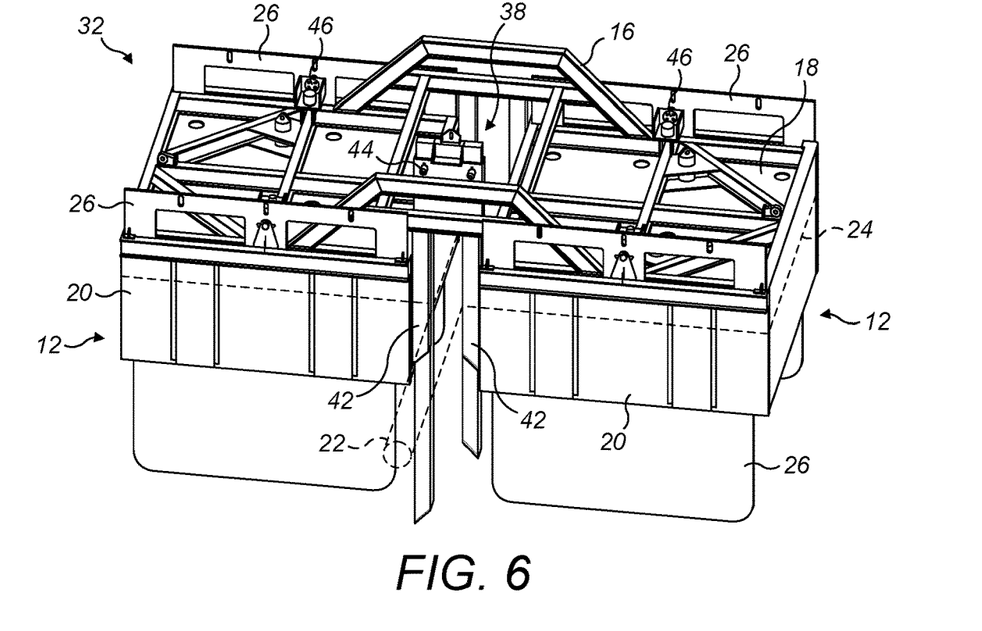
FIG. 6 corresponds to FIG. 5 but shows the pipeline anchor with the auxiliary plates also deployed in a lowered position.

The fork 38 can be lowered from a raised, retracted position shown in FIG. 4 to a lowered, deployed position shown in FIGS. 5 and 6. Retractable or removable pins 44 on the bridge structure 16 engage the fork 38 to lock the fork 38 in the retracted and deployed positions. As with the plates 26, the fork 38 can drop along the rails 42 under gravity from the retracted position when the pins 44 are released, penetrating the soil of the seabed 24 by virtue of self-weight and momentum. To ease penetration, the legs of the fork 38 are of different lengths and have tapered bottom ends.

In the sequence shown in FIGS. 4 to 6, the foundation 32 is landed on the seabed 24 with the mudmats 12 straddling the pipeline 22. The pipeline 22 is therefore accommodated in the channel 14 between the mudmats 12. It will be noted that the rails 42 that accommodate the legs 40 of the fork 38 have bottom ends that splay outwardly in the downward direction. This shaping guides the foundation 32 around the pipeline 22 by guiding the pipeline 32 into the channel 14 as the foundation 32 is lowered.

The rails 42 then embrace the pipeline 22 between them in the channel 14 as the skirts of the mudmats 12 embed into the soil of the seabed 24. As shown in FIG. 3, the rails 42 may also co-operate with engagement formations 34 of the pipeline 22 to restrain axial movement of the pipeline 22 relative to the foundation 32.

Initially, as shown in FIG. 4, the plates 26 and the fork 38 are raised in their retracted positions. Next, as shown in FIG. 5, the fork 38 is released to fall into the deployed position, where the fork 38 straddles the pipeline 22 with the legs 40 to respective sides. Finally, as shown in FIG. 6, the plates 26 are released to fall into their deployed positions in the manner of the first embodiment as shown in FIG. 2. The fork 38 ensures that the pipeline 22 is centrally disposed within the channel 14 to provide clearance for the plates 26 to be dropped without damaging the pipeline 22. The legs 40 of the fork 38 also protect the pipeline 22 from damage from the falling plates 26.

FIGS. 3 to 6 also show ROV-operable latches 46 mounted on the top panels 18 of the mudmats 12. Each plate 26 is co-operable with a respective one of the latches 46. Specifically, the latches 46 engage in apertures 48 in the plates 26 to lock the plates 26 in their retracted and deployed positions and then are disengaged from the apertures 48 to release the plates 26 for movement between those positions. Each plate 26 therefore has two apertures 48, one above the other, the appropriate aperture 48 being brought into alignment with the latch 46 when the plate 26 is in its retracted or deployed position.

Turning finally to FIGS. 7 and 8a to 8c, these drawings show a foundation 32 of the invention in two modes of use. This demonstrates that the same foundation 10 can be re-deployed at different subsea locations and potentially for different anchoring purposes, either on the same pipeline 22 or on a different pipeline.

Figure 7:
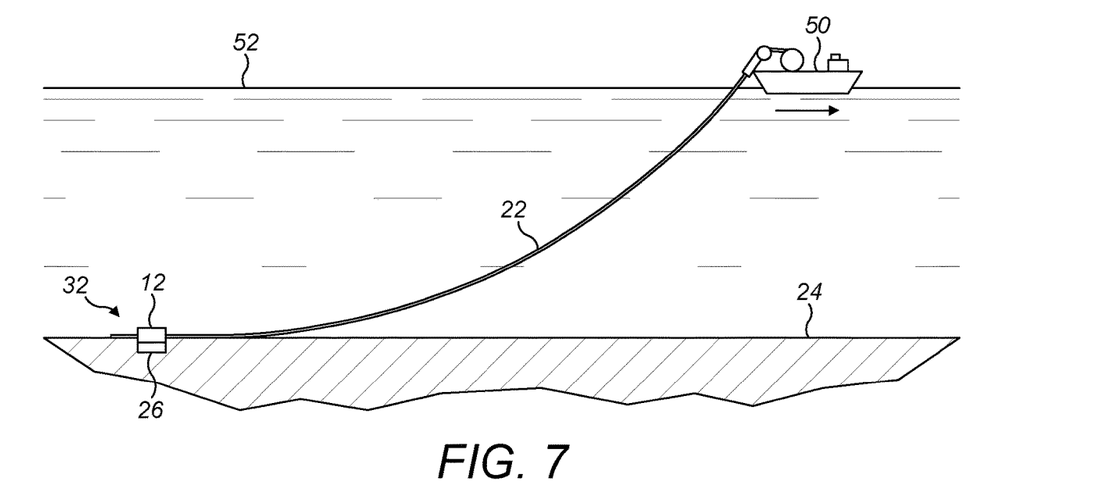
FIG. 7 is a schematic side view of a pipeline anchor of the invention being used to assist installation of a subsea pipeline.

In FIG. 7, the foundation 32 is shown engaged with the seabed 24 while straddling and anchoring a trailing end of a pipeline 22 being laid on the seabed 24. The pipeline 22 hangs as a catenary from an installation vessel 50 on the surface 52. The foundation 32 is shown here with its plates 26 deployed and embedded in the seabed 24 more deeply than its mudmats 12. This enables the shallow foundation 32 to provide improved axial location for the pipeline 22. In this way, the foundation 32 allows the installation vessel 50 to generate desired tension in the catenary of the pipeline 22 that hangs between the surface 52 and the seabed 24, without requiring more expensive and complex pile foundations.

When a sufficient length of the pipeline 22 has been laid on the seabed 24, the foundation 32 is no longer required to react against tension applied to the catenary by the installation vessel 50. Elegantly, the foundation 32 can then be repurposed to anchor the installed pipeline 22 at a different intermediate location along its length. This is shown schematically in FIGS. 8a to 8c, where a support vessel 54 shown at the surface 52 is equipped with a winch 56 and a lifting line 58 to lift and move the foundation 32 as required.

Figure 8A:
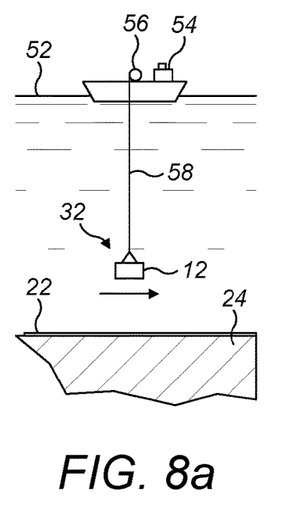
FIGS. 8a to 8c are a series of schematic side views that show the pipeline anchor of FIG. 7 being transferred underwater to, and fixed to the seabed at, another location along the pipeline after installation, thereby to locate the installed pipeline relative to the seabed.
Figure 8B:
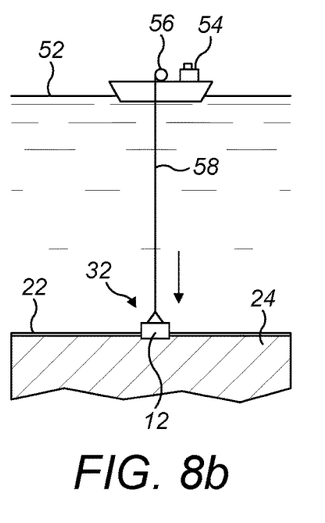
Figure 8C:
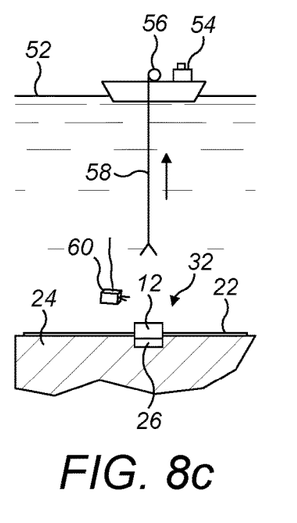

First, the foundation 32 is disengaged from the seabed 24 by lifting the plates 26 back to their retracted positions, for example by using the lifting line 58 or with the assistance of temporary buoyancy. The support vessel 54 then pus the foundation 32, with the plates 26 retracted into the mudmats 12, clear of the seabed 24 and transports the foundation 32 to a new intermediate location along the pipeline 22, with the foundation 32 preferably remaining underwater throughout as shown in FIG. 8a. Next, the foundation 32 is lowered back onto the pipeline 22 at the desired location as shown in FIG. 8b, partially embedding its mudmats 12 into the seabed 24. Finally, the plates 26 are released again to drop into their deployed positions, embedding deeper into the soil of the seabed 24 to relocate the foundation 32. An ROV 60 is shown supervising the operation and controlling release of the plates 26 using the latches 46 shown in FIGS. 3 to 6.

Many other variations are possible within the inventive concept. For example, the influence of gravity on the guillotine plates and the fork during deployment could be supplemented by additional downward force, for example external force applied by an ROV or on-board force applied by a drive system mounted on the foundation.

Each mudmat could have more or fewer guillotine plates, or such plates could be positioned differently with respect to each mudmat. For example, plates could be provided on one, three or four sides of a rectangular mudmat, or plates could be provided additionally or alternatively on sides rather than ends of the mudmat.

The bottom edge of each guillotine plate need not be horizontal or straight. The bottom edge could instead be inclined, toothed, undulating, castellated or downwardly-tapered to ease penetration into the seabed soil.

The engagement formations on the pipeline may be arranged to allow a limited range of movement of the pipeline relative to the foundation. For example, longitudinally-spaced stops may delimit both ends of the range to resist bidirectional movement of the pipeline or single stops may limit unidirectional movement in either longitudinal direction.

The invention claimed is:

1. A subsea foundation, comprising:
at least one mudmat having a top panel and a skirt depending from the top panel to be embedded into seabed soil; and
at least one auxiliary plate supported by the mudmat, the plate being deployable downwardly from a raised, retracted position in which the plate is held above a lower edge of the skirt into a lowered, deployed position in which the plate extends beneath the lower edge of the skirt to be embedded further into the seabed soil.

2. The foundation of claim 1, wherein the or each plate extends parallel to a portion of the skirt.

3. The foundation of claim 1, wherein the or each plate is deployable along a path that extends parallel to the skirt.

4. The foundation of claim 1, wherein the or each plate is positioned between the top panel and the skirt.

5. The foundation of claim 1, wherein the or each plate is on an inboard side of the skirt.

6. The foundation of claim 1, wherein the or each plate slides against the skirt during deployment.

7. The foundation of claim 1, wherein the or each plate is on an outboard side of the top panel.

8. The foundation of claim 1, wherein the or each plate is arranged to free-fall from the retracted position into the deployed position.

9. The foundation of claim 1, further comprising at least one ROV-operable latch that is arranged to hold the or each plate raised in the retracted position and that is operable to release the or each plate to drop into the deployed position.

10. The foundation of claim 1, comprising a pair of said mudmats that are mutually spaced about a central channel.

11. The foundation of claim 10, wherein the channel is open-ended and open-bottomed.

12. The foundation of claim 10, wherein the mudmats of the pair are joined by a bridge structure that extends across the channel.

13. The foundation of claim 12, wherein the or each plate is outboard of the bridge structure.

14. The foundation of claim 1, further comprising a stab mechanism having at least one downwardly-extending pin that is deployable downwardly into the seabed soil.

15. The foundation of claim 14, wherein the foundation comprises a pair of said mudmats that are mutually spaced about a central channel and the stab mechanism is aligned with or disposed in the channel between the mudmats of the pair.

16. The foundation of claim 15, wherein the stab mechanism comprises a pair of parallel pins that are spaced apart in a lateral direction across the channel.

17. A subsea installation comprising, in a combination, an elongate subsea element such as a subsea pipeline, and the foundation of claim 1 co-operating with the elongate element to restrict movement of the elongate element across the seabed.

18. The installation of claim 17, wherein the elongate element comprises engagement formations that are co-operable with complementary formations of the foundation.

19. The installation of claim 17, wherein the foundation comprises a pair of said mudmats that are mutually spaced about a central channel and wherein the elongate element extends along, and longitudinally beyond, the channel between the mudmats of the pair.

20. The installation of claim 17, wherein the foundation comprises a pair of said mudmats that are mutually spaced about a central channel and further comprises a stab mechanism having at least one downwardly-extending pin that is deployable downwardly into seabed soil, wherein the stab mechanism is aligned with or disposed in a central channel between the pair of said mudmats, and wherein the stab mechanism comprises a pair of parallel pins that are spaced apart in a lateral direction across the channel and wherein the elongate element is received in the space between the pins of the stab mechanism.

21. A method of fixing a subsea foundation at a seabed location, the method comprising:
lowering the foundation of claim 1 to the seabed location;
embedding the skirt of the or each mudmat into soil of the seabed; and
deploying the or each plate into the deployed position, embedded deeper than the skirt into the soil of the seabed.

22. The method of claim 21, comprising using the foundation to restrict movement of an elongate subsea element, such as a subsea pipeline, across the seabed.

23. The method of claim 22, comprising landing the foundation on top of the elongate element previously laid on the seabed.

24. The method of claim 23, where the foundation comprises a pair of said mudmats that are mutually spaced about a central channel and the mudmats of the pair are landed on mutually-opposed sides of the elongate element with the elongate element being received in the channel between them.

25. The method of claim 22, comprising engaging engagement formations of the elongate element with complementary formations of the foundation.

26. The method of claim 25, wherein the foundation comprises a pair of said mudmats that are mutually spaced about a central channel and further comprises a stab mechanism having at least one downwardly-extending pin that is deployable downwardly into seabed soil, wherein the stab mechanism is aligned with or disposed in a central channel between the pair of said mudmats, and wherein the stab mechanism comprises a pair of parallel pins that are spaced apart in a lateral direction across the channel and wherein the complementary formations of the foundation are defined by the pins of the stab mechanism.

27. The method of claim 26, comprising deploying the pins of the stab mechanism before deploying the or each plate of the foundation.

28. The method of claim 21, comprising: fixing the foundation at a first seabed location; returning the or each plate to the retracted position; and moving the foundation to be fixed at a second seabed location.

29. The method of claim 28, comprising moving the foundation from the first seabed location to the second seabed location while the foundation remains underwater.

30. The method of claim 28, wherein the first and second seabed locations are spaced apart longitudinally along an elongate subsea element.

31. The method of claim 30, comprising using the foundation at the first seabed location to restrict movement of the elongate element when initiating laying of the elongate element, and using the foundation at the second seabed location to restrict movement of the elongate element after the elongate element has been laid on the seabed.

* * * * *